ALKYL:

$-(CH_2)_6-$ , $CH_2-CH-(CH_2)_3-CH_3$, $CH_3-CH-CH_2-CH_2-CH-CH_3$, $-(CH_2)_3-$ ,

ARALKYL:

ARYLARALKYL:

ALKENE:

$-CH_2-CH=CH-CH_2-$ , $-CH_2-CH=C-CH_3$ , $-CH=CH-CH=CH-$ ,

POLYMERIC:

( WHERE n MAY BE FROM 1 to 50 )

BICYCLIC:

STEP 1

"SI"

STEP 2

"HSI"

STEP 3

3,817,937
REACTING HYDROXYL-TERMINATED ISOCYANURATE SALTS WITH DIISOCYANATES
Perry A. Argabright, Larkspur, and Brian L. Phillips and Larry M. Echelberger, Littleton, Colo., assignors to Marathon Oil Company, Findlay, Ohio
Filed Nov. 4, 1971, Ser. No. 195,812
Int. Cl. C08g 22/00
U.S. Cl. 260—77.5 NC    11 Claims

ABSTRACT OF THE DISCLOSURE

By reacting a diisocyanate and metal cyanate in the presence of an aprotic solvent, then contacting the reaction product with an excess of diol, a hydroxyl-terminated polyelectrolyte salt can be formed which is capable of reaction with an organic diisocyanate to produce a more complex polyelectrolyte.

CROSS-REFERENCE TO RELATED APPLICATIONS

The following U.S. Patent applications relate to compounds and uses which are generally related to the present invention: Ser. No. 157,236 filed June 28, 1971; Ser. No. 224,905 filed Feb. 9, 1972; Ser. No. 224,904 filed Feb. 9, 1972; Ser. No. 195,813, filed Nov. 4, 1971; Ser. No. 715,199 filed Mar. 28, 1968; Ser. No. 89,883, filed Nov. 16, 1970; Ser. No. 72,388, filed Sept. 15, 1970; Ser. No. 72,288 filed Sept. 15, 1970.

BACKGROUND OF THE INVENTION

Field of the invention

The present invention relates generally to the field of isocyanurate-containing organic compounds generally classified within Class 260 of the United States Patent Office.

Description of the prior art

The present invention is concerned with a new class of polymers. Prior art which might generally be considered relevant is U.S. patents 2,536,849; 2,866,801; 2,866,802; 2,993,870; 3,108,100; 3,211,704; 3,249,607; 3,259,626; 3,458,448; and 3,573,259.

SUMMARY OF THE INVENTION

General statement of the invention

The present invention relates to a new class of complex polyelectrolytes which are useful as water-thickening agents and emulsifiers. These compounds are characterized by containing the group shown in FIG. 1 of the present application; wherein:

R=divalent hydrocarbon or substituted hydrocarbon radical, as described below and exemplified in FIGS. 2 and 3, X=a metal or hydrogen or quaternary ammonium (which, for the purposes of this invention, acts like a metal) or a combination thereof. Particularly preferred are hydrogen, quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir;

R′=divalent hydrocarbon or substituted hydrocarbon radical, as discused below;

R‴=divalent hydrocarbon or substituted hydrocarbon radical derived from the organic diisocyanate, selected from the same class as described herein for R, $m$=number of trisubstituted isocyanate rings and is a positive integer from 0 to about 2000, and most preferably from 1 to about 200;

$n$=number of isocyanuric acid and/or isocyanurate salt groups and is a positive integer, preferably from 1 to about 10,000, more preferably from 2 to about 1,000, and most preferably from 3 to about 200;

$2m+n+1$=number of divalent R groups and is a positive integer from 2 to about 14,000, more preferably from 5 to about 1,400 and most preferably from 6 to about 600;

$p$=the number of repeating units (mers) in the polymer. For individual molecules $p$ will be an integer from about 1 to about 2000, more preferably from about 1 to about 1000, and most preferably from 2 to about 200, wherein there are no N-to-N bonds, no O-to-N bonds, no O-to-O bonds, no R-to-R bonds, no R-to-O bonds, no R′-to-N bonds, and no R‴-to-O bonds. R preferably contains 1 to 40, more preferably 2 to 30, and most preferably 2 to 18 carbon atoms; R′ preferably contains 1 to 40 carbon atoms, more preferably 1 to 20 carbon atoms and most preferably 1 to 10 carbons, for example:

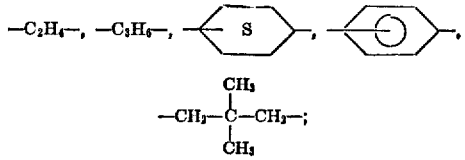

R and/or R′ can be substituted with groups that do not interfere in the product's subsequent utility or in its preparation; examples of such non-interfering groups are: —NO₂, Cl, F, Br, I, CN, —CO₂R″, —CO—R″, —SR″, NR₂″, —CONR₂″, —SO₃R″, —SO₂—, —SO—, phenyl, naphthyl, alkyl (1–40 carbon atoms), cyclohexyl, cyclopropyl, —OCOR″,

etc., where R″ can be lower alkyl (e.g., ethyl, hexyl) or aryl monovalent radicals. The examples of R and R′ (shown in FIG. 2 and FIG. 3) are set forth for purposes of elucidation, not restriction.

It will be recognized that the values of $m$, $n$, and $p$ described above, are on the basis of the integers which will be used to describe a single molecule. In actual practice, the invention will involve mixtures of molecules of the general form described above. Thus, the average value of $m$ for the mixture can be from about 1 to about 1,000, more preferably from about 2 to 500, and most preferably from about 3 to 200; the average value of $n$ can be from about 1 to 5,000, more preferably from about 2 to 1000, and most preferably from about 4 to 200; the value of $p$ can be from about 1 to 1,000, more preferably from 2 to 500, and most preferably from 4 to 200.

Utility of the invention

The present invention relates to a new class of polymers and their preparation. For example, the compounds of the present invention may be used as emulsifying agents, e.g., in producing emulsions of water in oils or other non-miscible materials. The products are merely added to the other emulsion ingredients and the mixture vigorously agitated to produce the emulsion.

DESCRIPTION OF THE PREFERRED EMBODIMENTS

Starting materials

Figure 1:
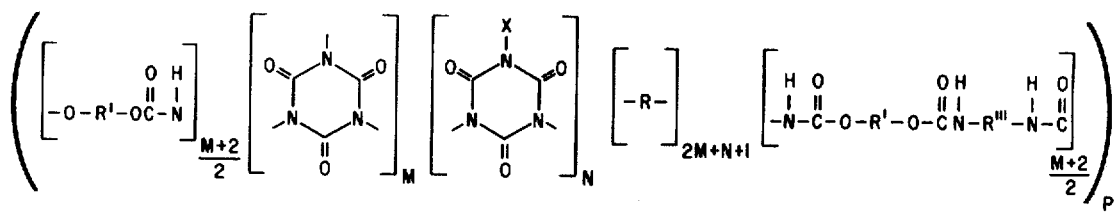
FIG. 1 shows the general formula of the products of the present invention.

Diisocyanates.—Organic diisocyanates having utility for the present invention are characterized by the following structural formula: OCN—R—NCO wherein R may be aryl such as:

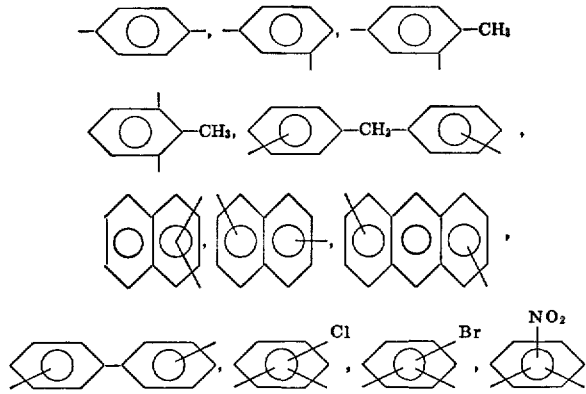

or other non-interfering substituted derivatives or compatible mixtures thereof. R may also be alkyl or olefinic. There are preferably from 1 to 40 carbon atoms, more preferably from 2 to 30 carbon atoms, and most preferably 2 to 18 carbon atoms per R group. R may also be aralkyl such as

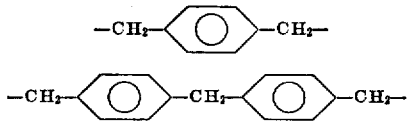

or noninterfering substituted derivatives thereof. R may also be a compatible mixture of any of aryl, alkyl, and aralkyl. R is preferably aryl, aralkyl or a noninterfering substituted derivative thereof, and the most preferred organic diisocyanate is 2,4-tolylene diisocyanate. Other examples of organic diisocyanates useful for this invention are: alkyl diisocyanates such as ethylene diisocyanate, trimethylene diisocyanate, tetramethylene diisocyanate, pentamethylene diisocyanate, 2-methyl-1,3-diisocyanatobutane, 1,3-diisocyanatocyclopentane, hexamethylene diisocyanate, octamethylene diisocyanate, dodecamethylene diisocyanate, and the like, or compatible mixtures thereof.

Metal cyanates.—Preferred metal cyanates are those of the alkali or alkaline earth metals, for example; Li, Na, K, Rb, Cs, Be, Mg, Ca, etc., or listed in the definition of X above.

Aprotic solvents.—The aprotic solvents having utility in this connection are characterized in that (1) they are liquid under the conditions of the reaction; (2) they have a high dielectric constant, i.e., greater than about 15 at 25° C.; (3) they preferably are dipolar, that is one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture. A mixture of solvents satisfying the foregoing criteria can be employed. Exemplary of solvents useful in carrying out the method are: alkyl pyrrolidones such as N-methylpyrrolidone-2 and N-ethylpyrrolidone-2; sulfoxides exemplified by dimethylsulfoxide, and diethylsulfoxide; alkyl amides including N,N-dimethylformamide, N,N-diethylformamide, N,N-dimethylacetamide and N,N-diethylacetamide; alkylphosphoramides and arylphosphoramides such as hexamethylphosphoramide, hexaethylphosphoramide, and hexaphenylphosphoramide; nitriles; examples of which are acetonitrile and benzonitrile; alkylureas such as tetramethylurea and tetraethylurea; and the like; and compatible mixtures thereof.

The quantity of solvent used is variable. From a practical standpoint, only so much of the solvent need be employed as is required to facilitate both maintenance of the desired temperature conditions and work-up of the end product. Generally speaking, the quantity of solvent used will range from about 0.5 to about 20, usually about 1 to about 5, liters per mole of organic diisocyanate employed.

Diols.—The diol will have the general formula: HO—R'—OH, where R' is as discussed above. Mixtures of different diols can be employed.

Mole ratios.—The preferred mole ratio of NCO groups to metal cyanate is from about 1 to about 10, more preferably from 1 to about 5, and most preferably from 1 to about 3. The preferred moles of free NCO in the SI product per mole of OH group in the diol is from about 3 to about 50, more preferably from 6 to about 20, and most preferably from 6 to about 12.

The preferred moles of free OH in the "HSI" product per mole of NCO in the organic diisocyanate (OCNR'''NCO)

is from about .1 to about 1.5, more preferably from .2 to about 1.2, and most preferably from .8 to about 1.1.

Temperature.—While not narrowly critical, the temperature will preferably be in the range from about 0 to about 300° C., more preferably from about 20 to about 200° C., and most preferably from about 20 to about 125° C.

Pressure.—The reaction will normally be conducted at atmospheric pressure, though elevated or reduced pressures may be utilized if desired because of special circumstances.

Figure 4:
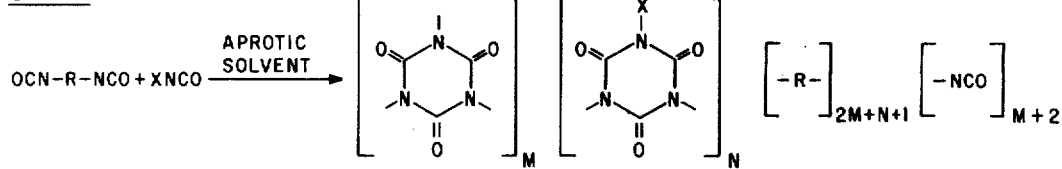
FIG. 4 shows the general reaction formula of the present invention. For purposes of the reaction shown in this figure, X cannot be a hydrogen atom, but may be any other species shown in its definition under General Statement of the Invention. A metal X, may be converted to a hydrogen atom by acidifying the polymeric product.
Figure 4:
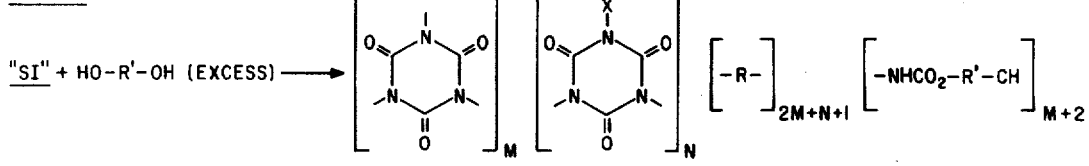
Figure 4:
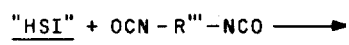
Figure 4:
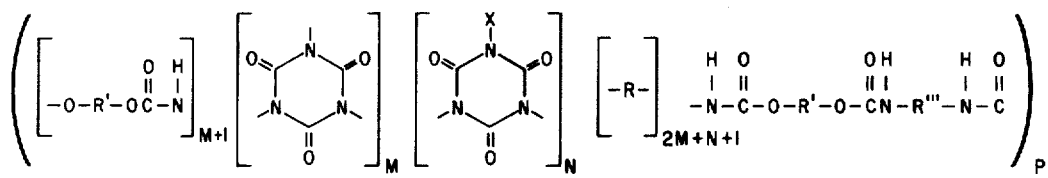

Time.—Referring to step 1 of FIG. 4, this reaction is accomplished by adding the diisocyanate relatively slowly to a slurry of the metal cyanate in the reaction solvent. While the time for addition of the diisocyanate will vary depending upon the specific compounds being utilized, in general it will be in the range of from about 0.01 to about 100 hours, more preferably from 0.5 to about 50 hours, and most preferably from 0.3 to about 24 hours.

Referring to step 2 of FIG. 4, the diol is preferably added relatively rapidly within a moderate period after step 1 is completed. Preferably it is added within an addition period of from about 0.001 to 0.2 hours, more preferably from 0.001 to 0.1 hours, and most preferably as quickly as possible. The diol addition should preferably begin after substantial completion of the reaction between the diisocyanate and the metal cyanate.

Referring to step 3 of FIG. 4, the diisocyanate is preferably added more or less continuously, over a moderately long time period. Preferably it is added over a period of from about 0.01 to 100 hours, more preferably from 0.1 to 50 hours, and most preferably from about 1 to 10 hours. Various modifications can be utilized for the addition of the starting materials and these will be readily apparent to those skilled in the art.

EXAMPLES

Example I

To a slurry of 16.3 g. (.25 mole) of NaOCN in 500 ml. of dry dimethylformamide (DMF) at 75° C. is added over 61 minutes .25 mole of 2,4-tolylene diisocyanate (TDI). The reaction is carried out in a nitrogen atmosphere. The mixture is stirred at 75° C. for 5 minutes after completion of the TDI addition, then 64 ml. of ethylene glycol are added. The mixture is then stirred at 75° C. overnight. The intermediate product (DMF soluble) is isolated by distilling away excess DMF and ethylene glycol followed by extracting in a Soxhlet apparatus for 5 days with acetone. The weight of the dry intermediate product is 46 g. The intermediate product, "HSI" (see FIG. 4) has a $2m+n+1:m+2$ ratio of 1.4 and contains 9.6 weight percent ethylene glycol. These results were obtained using nuclear magnetic resonance (NMR) spectroscopy.

The intermediate, "HSI," is then dissolved in 500 ml. of dry DMF and the solution heated to 75° C. To the solution is continuously added 32 g. (.18 mole) of TDI over about 11.5 hours. The reaction is carried out in a nitrogen atmosphere. About 12 hours after the TDI addition is complete, 50 ml. of methanol are added. The mixture is stirred an additional 5 hours. The product is isolated by distilling off the DMF and methanol, and is then washed with acetone to remove impurities.

The product weighs 81.4 g. after drying. The nmr spectrum shows $2m+n+1/R'$ ratio of 3.1 and no —HN—CO—OCH$_3$ groups.

Modifications of the invention

It should be understood that the invention is capable of a variety of modifications and variations which will be made apparent to those skilled in the art by a reading of the specification and which are to be included within the spirit of the claims appended hereto.

For example, the techniques including use of gross reaction product as taught in our copending application, Ser. No. 195,813 filed Nov. 4, 1971 are applicable to steps 1 and 2 of the present invention.

What is claimed is:

1. Polymeric compositions comprising mixtures of molecules containing groups having the structure:

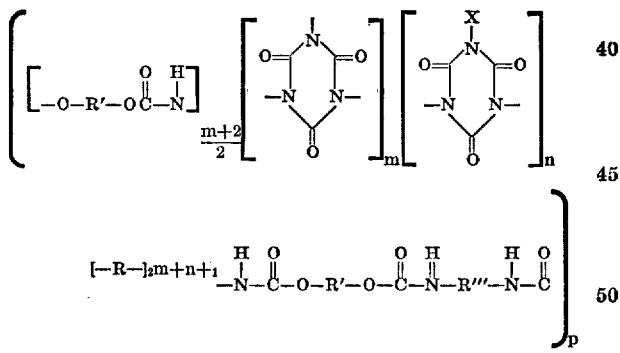

wherein:

R and R'''=divalent hydrocarbon or substituted hydrocarbon radical containing 1 to about 40 carbon atoms, X=a metal or hydrogen or quaternary ammonium, or a combination thereof, R'=divalent hydrocarbon or substituted hydrocarbon radical containing 1 to about 40 carbon atoms, m=number of trisubstituted isocyanurate rings and is a positive integer from 0 to about 2000, n=number of isocyanuric acid and/or isocyanurate salt groups and is a positive integer from 1 to about 10,000, $2m+n+1$=number of divalent R groups and is a positive integer from 2 to about 14,000, p=the number of repeating units (mers) in the polymer, for individual molecules p will be an integer from about 1 to about 2,000, and wherein there are no N-to-N bonds and no O-to-N bonds and no O-to-O bonds and no R-to-R bonds and no R'-to-N bonds and no R-to-O bonds and no R'''-to-O bonds, wherein the average value of m for said mixture is from about 1 to about 1,000, the average value of n for said mixture is from about 1 to about 5,000 and the average value of p for said mixture is from about 1 to about 1,000.

2. A process for the manufacture of polymers comprising mixtures of molecules having the structure:

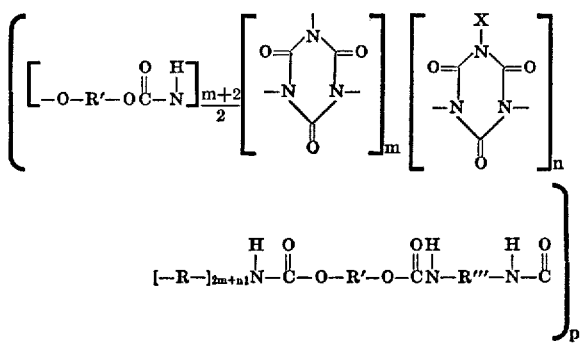

said process comprising in sequence the steps of:

(a) reacting OCN—R—NCO with XNCO in the presence of an aprotic solvent to form an isocyanurate-containing compound having the structure:

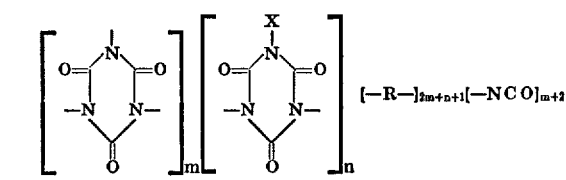

(b) contacting the reaction product of the preceding step with a stoichiometric excess of an organic diol having the structure HO—R'—OH to form a hydroxy-terminated polyelectrolyte and, (c) reacting said hydroxy-terminated polyelectrolyte with organic diisocyanate to form said complex polyelectrolytes, wherein:

R is a divalent hydrocarbon or substituted hydrocarbon radical containing 1 to about 40 carbon atoms, R''' can be the same or different from R and is selected from the same group as is R, X is selected from the group consisting of metals or quaternary ammonium radicals, R' is a divalent hydrocarbon radical or substiuted hydrocarbon radical containing from 1 to about 40 carbon atoms, wherein m is the number of trisubstituted isocyanurate rings per molecule and is a positive integer from zero to about 2,000, n is the number of isocyanurate salt groups and is a positive integer from 1 to about 10,000, wherein $2m+n+1$ is the number of divalent R groups and is a positive integer from 2 to about 14,000, and wherein p is the number of repeating units (mers) in the polymer, the individual molecules p will be an integer from about 1 to about 2,000, and wherein there are no N-to-N bonds and no O-to-N bonds and no O-to-O bonds and no R-to-R bonds and no R-to-O bonds and no R'-to-N bonds and no R'''-to-O bonds, wherein the average value of m for said mixture is from about 1 to about 1,000, the average value of n for said mixture is from about 1 to about 5,000 and the average value of p for said mixture is from about 1 to about 1,000.

3. A process according to claim 2 wherein R, R', and R''' can be the same or different and wherein each is selected from the group of organic radicals shown below:
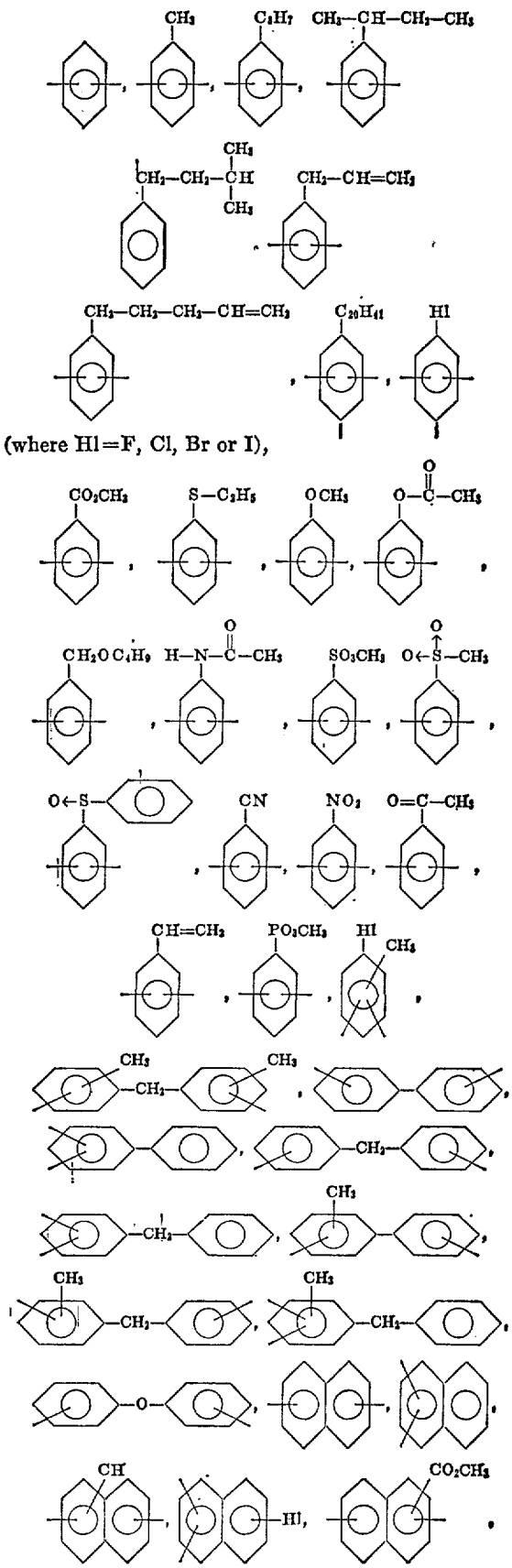
(where Hl=F, Cl, Br or I),
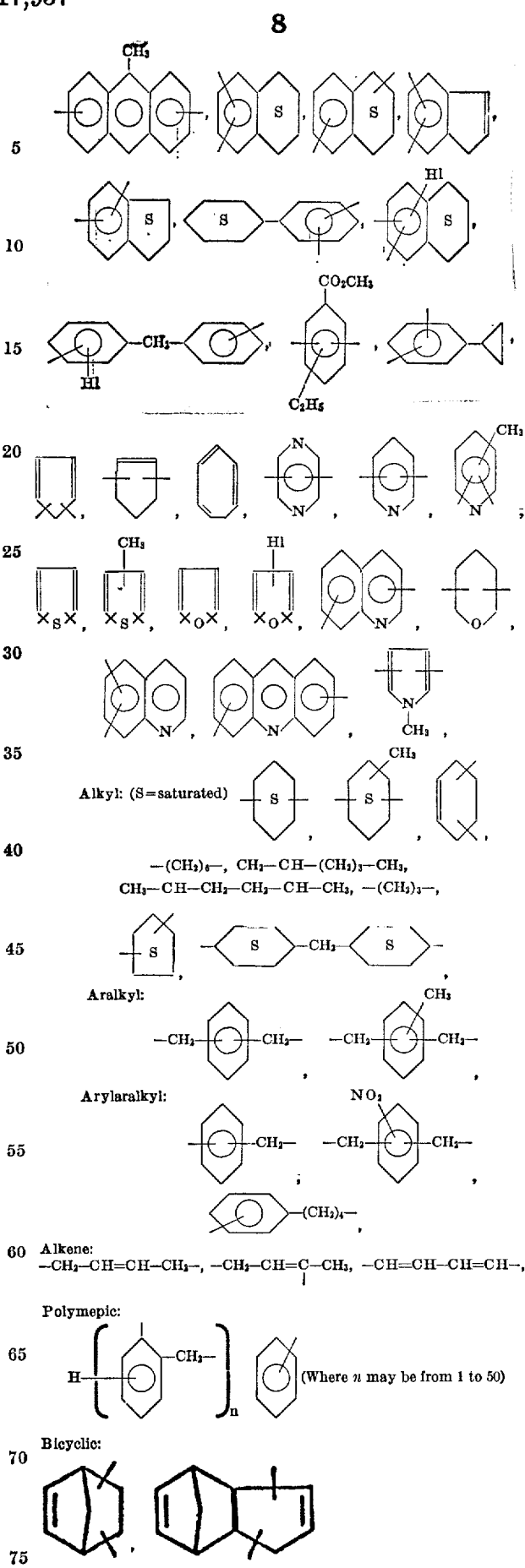
Alkyl: (S=saturated)
$-(CH_2)_6-$, $CH_3-CH-(CH_2)_3-CH_3$,
$CH_3-CH-CH_2-CH_2-CH-CH_3$, $-(CH_2)_3-$,
Aralkyl:
Arylaralkyl:
Alkene:
$-CH_2-CH=CH-CH_3-$, $-CH_2-CH=C-CH_3$, $-CH=CH-CH=CH-$,
Polymepic:
(Where $n$ may be from 1 to 50)
Bicyclic:

4. Compositions according to claim 1 wherein X is selected from the group consisting of hydrogen, quaternary ammonium radicals and metal radicals selected from the following groups of the Periodic Table, Ia, Ib, IIa, IIb, IIIa, IIIb, IVa, IVb, Va, Vb, VIa.

5. Compositions according to claim 1 wherein $m$ is a positive integer from 1 to about 200, wherein $n$ is a positive integer from 2 to about 1000, wherein $2m+n+1$ is a positive integer from about 5 to about 1400, and wherein $p$ is the number of repeating units (mers) in the polymer, and for individual molecules, $p$ will be an integer from about 1 to about 1000.

Figure 2:
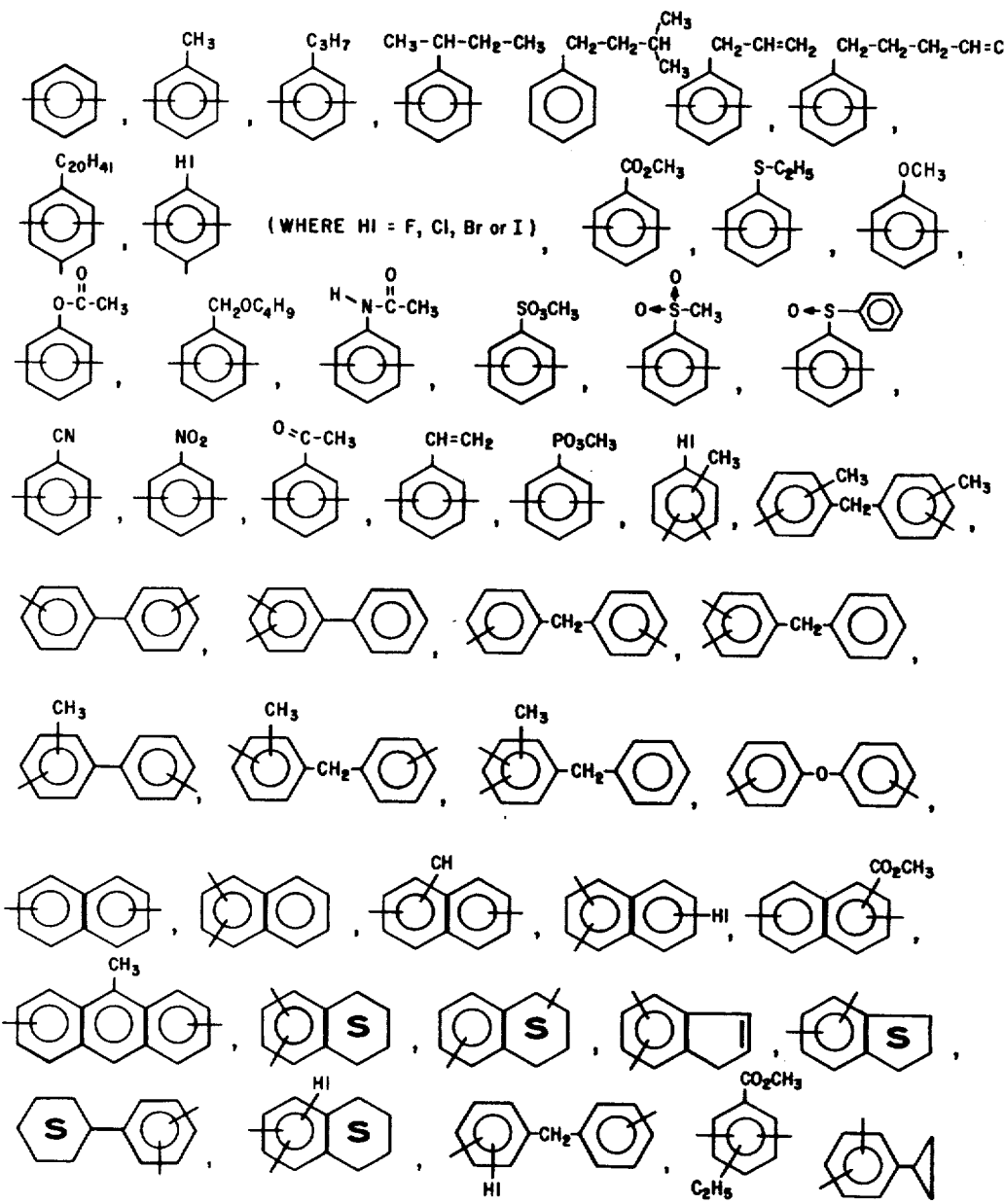
FIGS. 2 and 3 exemplify some of the possible structures of R, R′, and R‴ groups of the starting materials and products of the present invention.
Figure 3:
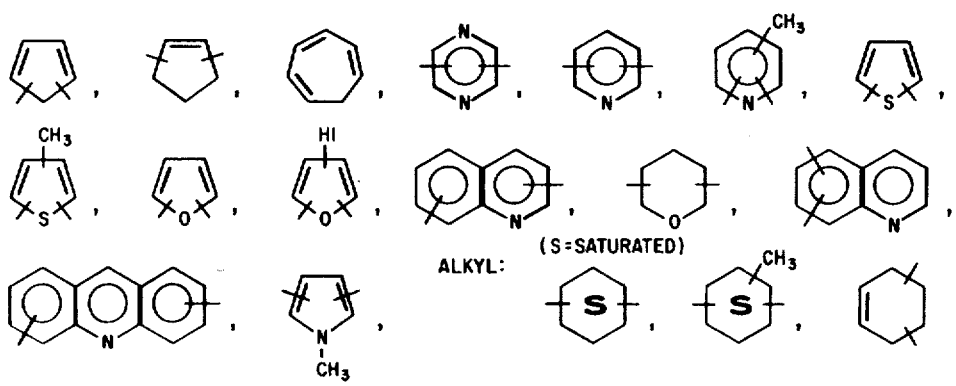
Figure 3:
Figure 3:
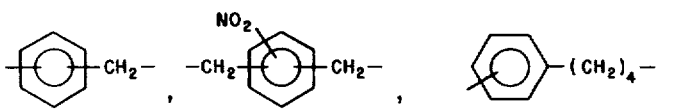
Figure 3:
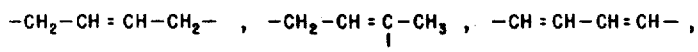
Figure 3:
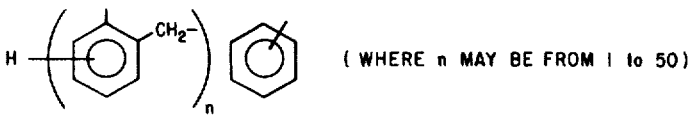
Figure 3:
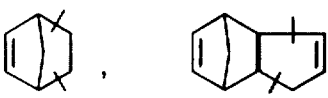

6. Compositions according to claim 1 wherein R and R''' are the same or different and are selected from the group of organic radicals shown in FIGS. 2 and 3 and the substituted derivatives thereof which are substituted with radicals selected from the group consisting of —NO, Cl, F, Br, I, CN, —CO$_2$R'', —CO—R'', —O—R'', —SR'', NR$_2$'', —CONR$_2$'', —SO$_3$R'', —SO$_2$—, —SO—, phenyl, naphthyl, alkyl (1–40 carbon atoms), cyclohexyl, cyclopropyl, —OCOR'',

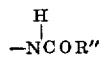

and wherein R'' is lower alkyl or aryl.

7. Compositions according to claim 1 wherein R' contains from 1 to 20 carbon atoms and is selected from the group consisting of

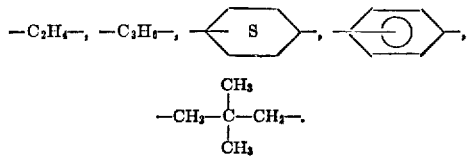

8. A process according to claim 2 wherein X is selected from the group consisting of quaternary ammonium radicals and metal radicals selected from the following groups of the Periodic Table; Ia (except hydrogen), Ib, IIa, IIb, IIIa, IIIb, IVa, IVb, Va, Vb, VIa.

9. A process according to claim 2 wherein $m$ is a positive integer from 1 to about 200, wherein $n$ is a positive integer from 2 to about 1000, wherein $2m+n+1$ is a positive integer from about 5 to about 1400, and wherein $p$ is an integer from 1 to about 1000.

10. A process according to claim 2 wherein R is selected from the group of organic radicals shown in FIG. 2 and the substituted derivatives thereof which are substituted with radicals selected from the group consisting of —NO, Cl, F, Br, I, CN, —CO$_2$R'', —CO—R'', —O—R'', —SR', NR$_2$'', —CONR$_2$'', —SO$_3$R, —SO$_2$—, —SO—, phenyl, naphthyl, alkyl (1–40 carbon atoms), cyclohexyl, cyclopropyl,

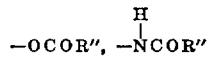

where R'' is lower alkyl or aryl monovalent radical.

11. A process according to claim 2 wherein R' contains from 1 to 20 carbon atoms and is selected from the group consisting of —C$_2$H$_4$—, —C$_3$H$_6$—,

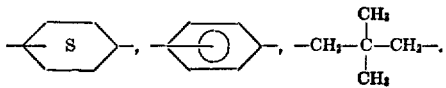

References Cited
UNITED STATES PATENTS
3,573,259   3/1971   Argabright et al. _ 260—77.5 NC DONALD E. CZAJA, Primary Examiner M. J. WELSH, Assistant Examiner U.S. Cl. X.R.
260—248 NS

UNITED STATES PATENT OFFICE
CERTIFICATE OF CORRECTION

Patent No. 3,817,937          Dated June 18, 1974

Inventor(s) Perry A. Argabright et al

It is certified that error appears in the above-identified patent and that said Letters Patent are hereby corrected as shown below:

Col. 5, Claim 1, first word:    Delete "Polymeric" and insert therefor --Polyelectrolyte--.

Claim 1: Structure:    Delete "$\frac{M+2}{2}$" and insert --M+1--.

Claim 2, line :    Before "polymers" insert --polyelectrolyte--.

Claim 2: Structure:    Delete "$\frac{M+2}{2}$" and insert --M+1--.

Signed and Sealed this

Thirteenth Day of September 1977

[SEAL]

*Attest:*

RUTH C. MASON
*Attesting Officer*

LUTRELLE F. PARKER
*Acting Commissioner of Patents and Trademarks*